Feb. 22, 1938.                J. T. MORGAN                2,108,941
     CHANGE SPEED GEAR MECHANISM FOR CYCLES AND THE LIKE
                Filed March 23, 1937        3 Sheets-Sheet 3
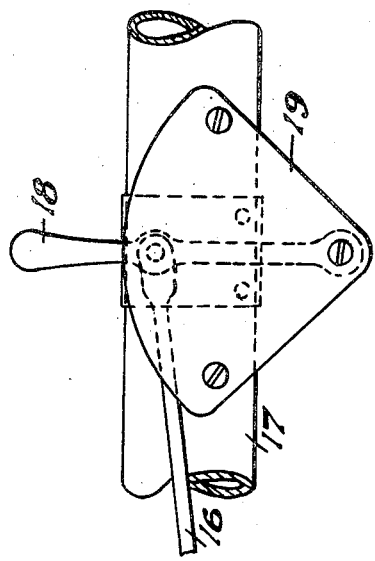
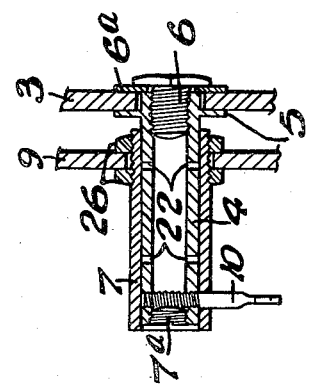
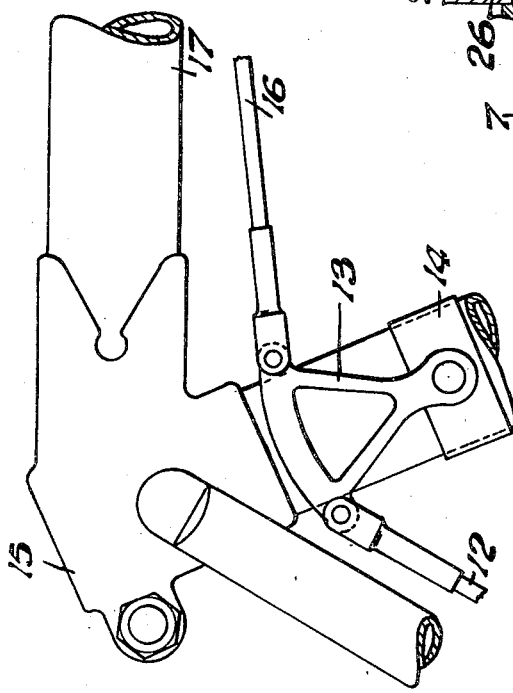

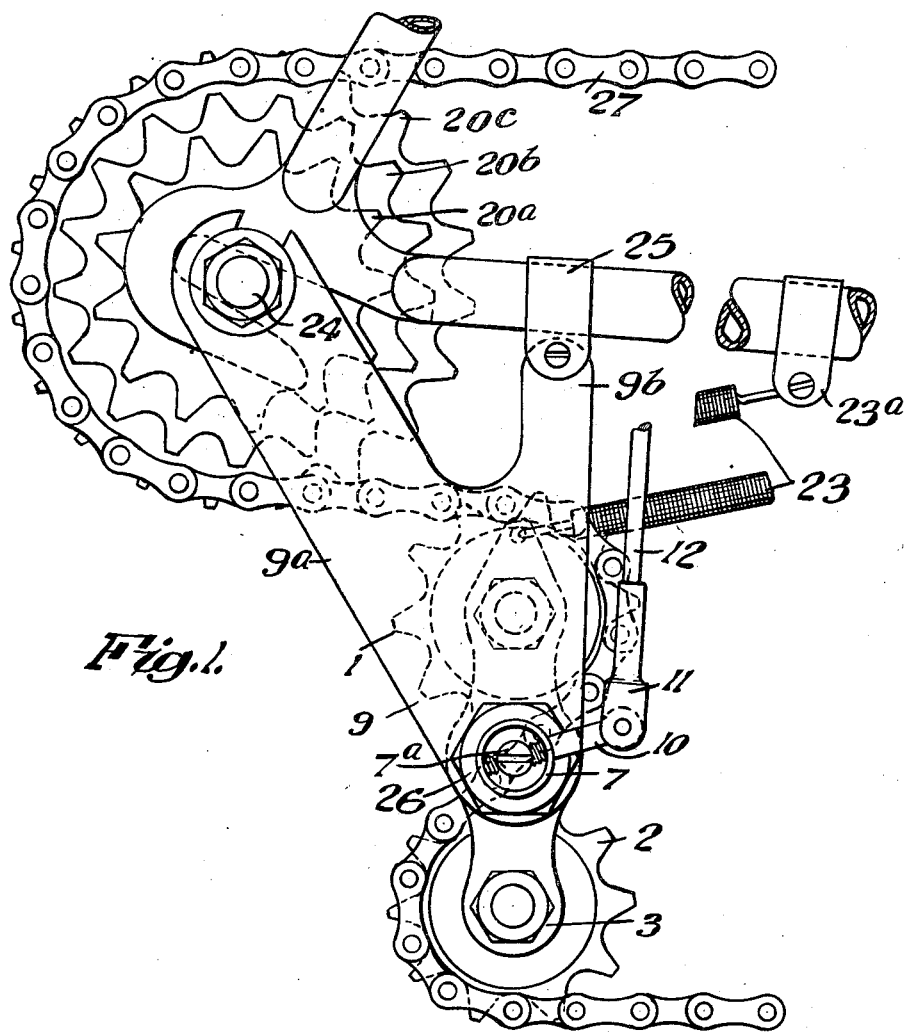

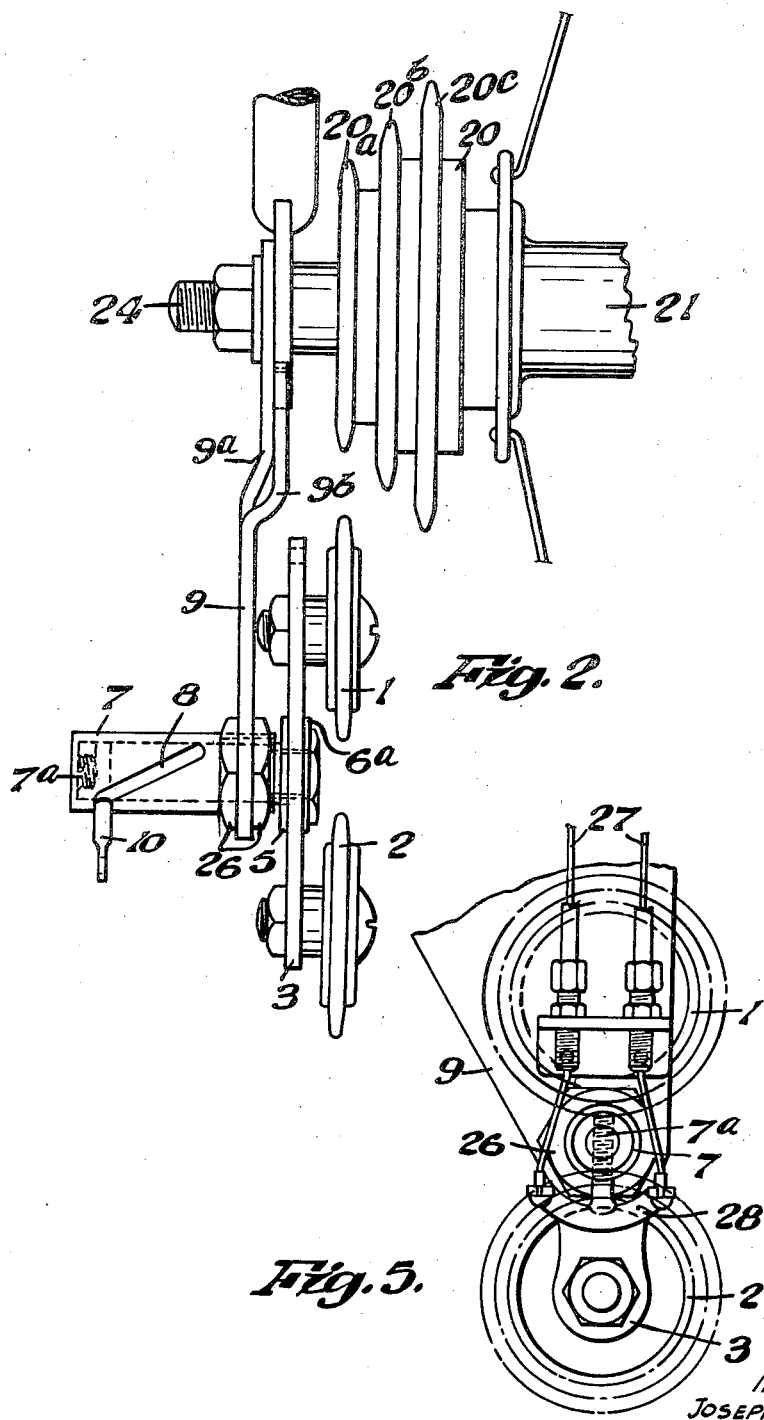

Patented Feb. 22, 1938

2,108,941

UNITED STATES PATENT OFFICE 2,108,941

CHANGE SPEED GEAR MECHANISM FOR CYCLES AND THE LIKE

Joseph Thomas Morgan, Cardiff, Wales

Application March 23, 1937, Serial No. 132,576
In Great Britain April 14, 1936

3 Claims. (Cl. 74—217)

This invention relates to improvements in shifting mechanism for use with change speed gear mechanism for cycles and the like and more particularly change speed gear mechanism of the type in which to obtain variation in the gear ratio; the driving chain is moved from one to another of different sized sprockets by translative displacement of a jockey sprocket.

An object of the present invention is to provide a simple, strong and positive change speed gear mechanism in which there are but few parts and in which no power or speed is lost in changing from one gear to another.

Another object of this invention is to obtain a balanced arrangement of rocker arm and pair of chain receiving sprocket wheels carried thereby and which can be positively operated by a simple lever connection direct to a simple hand operated member so as to obviate complicated clutch or spring devices to move the rocker arm both translatively and pivotally to effect the desired gear change.

In carrying one form of this invention into practice a change speed gear mechanism for cycles and the like comprises a rocker arm carrying at each end a rotatable jockey sprocket, said rocker arm being mounted for axial and part rotary movement by means of a pivotal member arranged between its ends at right angles thereto and slidably engaged in a helically slotted tube projecting from an arm depending from the cycle frame whereby the rocker arm is supported in a balanced manner, and radial movement of the pivotal member is effected by a pin radiating from the pivoted member and projecting through the helical slot, the outer end of this pin receiving a rod connected to a hand operated device, so that a push and pull operation of said radial pin effects axial translative movement of the pivoted member and consequently axial movement of the jockey sprockets across a multiring sprocket on the driving wheel hub and an appropriate slipping of the driving chain from one toothed ring to another.

A push-pull operating rod in an ordinary "diamond" frame machine may be arranged along the cross tube and connected to further drop rod by a pivoted T shaped lever or bell crank arranged on the machine frame just below the saddle lug, the lower end of the drop rod being secured to the crank arm on the pivot member of the sprocket plate.

In order that this invention may be clearly understood and readily carried into effect I have appended hereto a sheet of drawings illustrating an embodiment thereof, and wherein:—

Fig. 1 is a broken side elevation showing the change speed gear set to low gear.

Fig. 2 is a front elevation of Fig. 1, but showing the change speed gear set to top gear.

Fig. 3 is a broken side elevation showing the mounting of the control rods and lever.

Fig. 4 is a detail section view showing the mounting of the slidable pivot member by which the jockey sprockets are displaced to effect a change of gear, and Fig. 5 shows a modified form of control device.

Referring to the drawings a pair of jockey sprockets 1 and 2 are arranged one at each end of a plate 3 which is somewhat in the form of a balanced rocker arm but arranged substantially vertically. The centre of this plate or rocker arm 3 is fixed to one end of a hollow shank 4, e. g. by being freely mounted so that it may swivel between a flange 5 on the shank and an annular washer like member 6a, the latter being held in position by the head of a screw 6 threaded into the shank 4. The hollow shank 4 projects at right angles from the plate 3 and is slidable in a tubular member 7 formed with a helical slot 8 and supported in the lower end of a bracket arm 9 depending from the chain stays of the machine frame. The shank 4 is provided with a radially projecting finger 10 or crank arm projecting through the helical slot 8 in its supporting member 7, the free end of the finger 10 being secured to a bifurcated socket member 11 at the lower end of a substantially vertical operating rod 12 connected at its upper end to one side of a segmental lever or plate 13 pivoted at its apex end to the machine frame for instance to a clip 14 secured to the frame just below the saddle lug 15. A further rod 16 is connected to the other corner of the segmental lever 13 and is arranged nearly parallel to the cross tube 17 of the machine frame, the forward end of the rod being connected to a lever 18 located so as to be conveniently accessible by the cyclist, and preferably carried by a segmental support 19 having floating control for the lever 18.

Operating of the control knob in a forward or rearward direction causes an appropriate radial movement of the finger 10 projecting from the shank 4 on the sprocket plate 3 and an accompanying axial movement of the shank in its bearings at the end of the bracket arm by reason of the helical slot 8 through which the crank passes. The jockey sprocket carrying plate 3 is thus caused to move simultaneously arcuately and translatively across a multiple chain ring or sprocket 20 on the hub 21 of the driving wheel of the machine so that the displaced jockey sprockets cause the lower run of the driving chain 27 to be eased on to the required sprocket ring.

It will be seen by reference to Fig. 2 that the arcuate movement of the sprocket carrying plate 3 is complementary to the variations in diameter of the sprockets of the multiple sprocket device 20, the upper sprocket 1 being swung downwards as it moves from the top speed sprocket 20a to the second speed sprocket 20b, and still further downwards as it moves towards the low speed or largest diameter sprocket 20c. By this means variations in the length of chain occupied by the sprockets is automatically compensated for by automatic adjustments in the position of the upper sprocket 1 relatively to the multiple sprocket device 20.

The shank 4 is made hollow so that it can be filled with grease which can be forced in as by the use of a grease gun to flow through a number of radial apertures 22 therein to lubricate the wall of the helically slotted tube and facilitate the rotary and axial movement of the shank. The end of the shank 4 remote from the screw 6 can be closed by a removable grub screw 7a which also serves to lock the member 10 in position.

A tension spring 23 is secured between the upper end of the jockey sprocket plate 3 and a convenient part of the machine frame for instance a clip 23a to take up any slack in the driving chain.

The bracket arm 9 is firmly held in position by extending it in the form of an arm 9a slotted at its upper end for engagement over the spindle 24 of the hub 21 and bracing it by means of an upstanding arm 9b secured to a clip 25 fixed to the cycle frame. The tubular member 7 is secured thereby by a pair of nuts 26 on the tubular member 7 against opposite sides of the bracket 9, for adjustment purposes.

An arrangement according to my invention is simple and cheap to manufacture and has but few parts to maintain in working condition. In Fig. 5 a pair of Bowden wires 27 are secured at their ends to the extremities of a substantially T-shaped member 28 substituted for the member 10 as shown. A pull on either of the wires 27 will cause an appropriate movement of the member 28 and an axial movement of the shank 4 and plate 3.

I claim:—

1. Shifting mechanism for use with change speed gear for chain and sprocket gear propelled cycles and the like in which a number of sprockets of varying diameters are adapted to be selectively engaged by the chain, a bracket fixed to the cycle frame, a tubular supporting member carried by said bracket, a rocker arm, a pivot member fixed to the rocker arm between the ends of the arm, a pair of jockey sprockets carried by the ends of the rocker arm, said tubular supporting member slidably and rotatably accommodating said pivot member, a helical slot in said tubular member, a lever comprising substantially radial pin carried by said pivot member passing through said slot, an upstanding rod connected at its lower end to said pin, a substantially horizontal rod, a lever connecting the upper and rear ends of the upstanding and substantially horizontal rods respectively, and a gear selecting control device connected to the front end of the substantially horizontal rod for imparting a push-pull operation to said radial pin to impart by reason of said pin and helical guide a movement of translation of the rocker arm simultaneously with arcuate movement thereof.

2. Shifting mechanism for use with change speed gear for chain and sprocket gear propelled cycles and the like in which a number of sprockets are adapted to be selectively engaged by the chain, comprising a jockey sprocket, a pivot member, a supporting member carrying said pivot member, a pin carried by one of said members and adapted to act as a lever, and a helical guide for said pin in the other member, a rocker arm carrying said jockey sprocket and carried by said pivot member, and hand operated remote control means connected to said pin to partially rotate one of said members to impart by reason of said pin and helical guide a movement of translation of the rocker arm simultaneously with arcuate movement thereof.

3. Shifting mechanism for use with change speed gear for chain and sprocket gear propelled cycles and the like in which a number of sprockets of varying diameters are adapted to be selectively engaged by a chain, comprising a rocker arm, a pivot member fixed to the rocker arm between the ends of the arm, a fixed tubular supporting member slidably and rotatably accommodating said pivot member, a pair of jockey sprockets carried by the ends of the rocker arm, a helical slot in said tubular member, a substantially radial pin carried by said pivot member passing through said slot, and hand operated remote control means connected to the outer end of said pin for moving it along said slot to impart simultaneous sliding and arcuate movements to said rocker arm.

JOSEPH THOMAS MORGAN.